Dec. 13, 1960 G. DIRKS 2,964,739

RECORDING OF DIGITAL INFORMATION IN PARALLEL FORM

Filed May 13, 1958 4 Sheets-Sheet 1

Inventor:
Gerhard Dirks
by:
Michael S. Striker
Attorney

Inventor:
Gerhard Dirks
by:
Michael S. Striker
Attorney

Dec. 13, 1960 G. DIRKS 2,964,739

RECORDING OF DIGITAL INFORMATION IN PARALLEL FORM

Filed May 13, 1958 4 Sheets-Sheet 3

Inventor:
Gerhard Dirks
by:
Michael S. Striker
Attorney

RECORDING OF DIGITAL INFORMATION IN PARALLEL FORM

Filed May 13, 1958 4 Sheets-Sheet 4

Inventor:
Gerhard Dirks
by:
Michael S. Striker
Attorney 2,964,739

RECORDING OF DIGITAL INFORMATION IN PARALLEL FORM

Gerhard Dirks, Morfelder Landstrasse 44, Frankfurt am Main, Germany

Filed May 13, 1958, Ser. No. 734,980
Claims priority, application Germany Oct. 1, 1948
15 Claims. (Cl. 340—174)

Continuation-in-part of patent application No. 498,057 filed March 30, 1955, now abandoned, which itself is a continuation-in-part of patent application No. 101,032 filed June 24, 1949, now abandoned.

The present invention relates to the recording in parallel form of stored information in which the storage is sensed denomination by denomination, i.e., serially.

The information may be recorded by a multi-column printing mechanism as printed characters. Such mechanism has a plurality of printing elements, each element being adapted to record any of the plurality of characters which it may be required to print in a column. The printing elements are operated in synchronism with each other and on a cyclic basis. The character recorded by any element which is to be printed from in each cycle is determined by the stage in the printing cycle at which an electrical impulse is received by a character selecting means associated with that printing element. Such printing mechanisms are well-known, particularly in relation to printing information derived from punched record cards. One such printing mechanism is shown in U.S. Patent No. 1,791,762. Similarly, characters may be recorded in code by a multi-column punching mechanism with character selecting means for each column. Such mechanisms are well-known and one form is described in Reissue Patent No. 21,133. The mechanism in this form operates cyclically and the character recorded by the punch element is determined by the stage in the cycle at which an electrical impulse is received by a control electromagnet associated to select a punch element in a manner comparable to that in which the printing mechanism operates. Recording mechanisms in which the data are recorded in parallel columns during a cycle and in which the character or code is selected by the operation of selecting means at a selected time or times in this cycle of operation will be referred to hereinafter as "recording mechanisms of the type described."

An object of the invention is to provide for the recording of information, by recording mechanisms of the type described, from a data storage means which is cyclically sensed.

Another object of the invention is to provide that at least a complete cycle of sensing of the storage means is effected for each possible stage in which an electrical impulse may be received by the control element in the cycle of operation of the recording mechanism, but that subject to this limitation the cycle of sensing and the cycle of recording may be unsynchronized.

Another object of the invention is to avoid a plurality of buffer storage elements for each columnar position of the recording mechanism.

Another object of the invention is to employ a rotary magnetic store sensed repeatedly and to select one character or code at a time for read out under control of the recorder for distribution to selected columns of the recorder.

Another object of the invention is to provide apparatus for recording information with a cyclic recording mechanism of the type described, the information being stored on a cyclically sensed storage device having a plurality of signal storage areas, each of which is divided into digital areas, in which at each stage of the recording cycle groups of storage areas are sensed in turn and signals derived from those and only those digital areas in each group of storage areas which contain signals corresponding to characters appropriate to that stage, are fed to distributing means which discriminate between signals derived from different groups of storage areas, the distributing means being connected to the columnar character selecting elements of the recording mechanism so that each signal derived from each storage area is caused to select the said character selecting element of the recording element associated with that storage area for recording.

Still another object of the invention is to record in a parallel multi-column recorder data originally recorded on a magnetic storage surface in denominational areas sensed denomination after denomination cyclically and delivered to recording apparatus adapted to record denominations in parallel in one cycle and effected by means of read out to the recorder in synchronism with the recording apparatus at each stage in the cycle of the recording apparatus by scanning all the denominations of the magnetically stored data and selecting only one code value for reading out from any denomination in which it was recorded during each recording apparatus stage to select all the values in preselected columns related to the denominational areas for recording.

An important advantage of this arrangement is that the recording apparatus may be unsynchronized with the sensing cycle, subject only to the sensing cycle being completed for each stage or operational index point of the recording apparatus. Another advantage is that read out of the stored data can begin with the first sector or denomination available when read out is called by the stage indicator or emitter of the reproducer.

Other objects of the invention will be pointed out in the following description and claims and illustrated in the accompanying drawings which disclose, by way of example, the principle of the invention as applied to a well-known printer and a well-known punch.

Figures 1, 2:
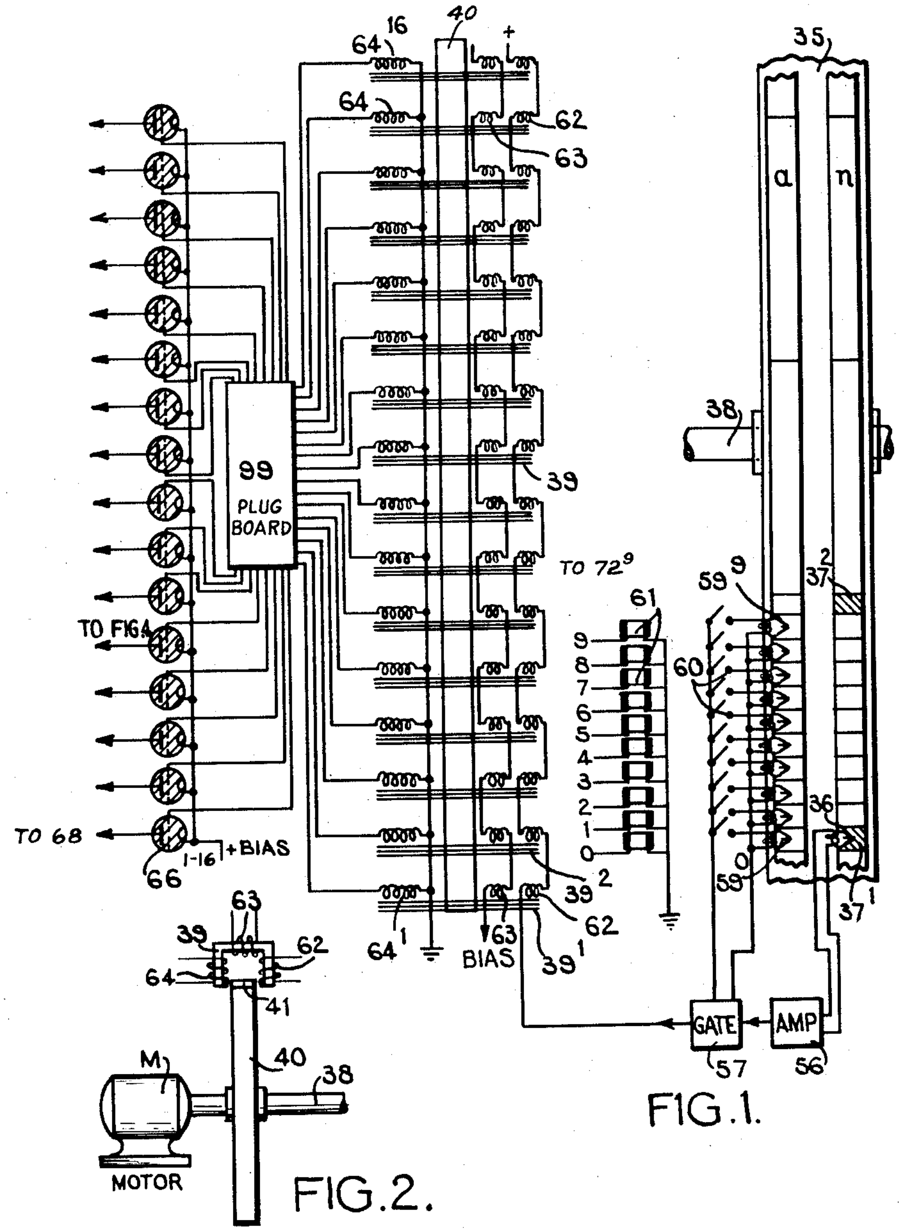
Figure 1 shows diagrammatically a magnetic store (part cut away) and the circuit for read out therefrom.
Figure 2 shows a diagrammatic elevation of the inductive distributor.

Fig. 1 shows a magnetic drum 35 mounted on a shaft 38 adapted to be continuously rotated by a motor M (Fig. 2) and having two magnetizable tracks, *a* for data signals and *n* for start marks which define the start of sectors or denominations of data. Sixteen such sectors are provided around the circular track. These start marks 37 are recorded as pulses opposite a corresponding zero position in each sector of the data track. $37^1$ represents the start mark of the first denomination, $37^2$ the start mark of the next denomination, and so on. On the track *a* in the length between the start mark is a succession of possible positions in which digital data may be recorded, e.g., for decimal notation there would be ten possible positions representing "0" to "9," the "0" position being opposite the start mark. The start mark is sensed by a magnetic head 36 of conventional form positioned over the track and shown schematically. The winding of head 36 is connected to an amplifier 56 normally saturated so that on a negative input signal from said head it delivers a positive signal to an electronic gate 57. The gate 57 may conveniently be a pentode with two control grids, one of which is connected to the input signal.

Over the data track *a* are positioned ten sensing heads $59^{0-9}$, each spaced apart so that when $59^{0}$ is opposite the "0" value position each of the other heads is opposite its corresponding digital position in the same denomination. These heads may each be connected to the other control grid of the gate 57 by one of the switches 60. Only one of the switches 60 is closed at any one time. These switches represent the contacts of relays 61 which are operated in turn with the operational value index points of the reproducing or recording apparatus as hereinafter described.

It will be seen that with one of the switches 60 closed its associated sensing head will deliver a positive going signal to the gate 57 but that only the signal generated when a start mark is also under head 36 will be delivered as a coincident output signal to the gate 57, to effect conduction of the pentode and hence a current signal for connection to the distributor.

The inductive distributor shown in Figures 1 and 2 comprises a wheel 40 mounted on the same shaft 38 as the magnetic drum 35 and fixed to rotate with it. The wheel 40 carries an inductive yoke 41 passing between the poles of each core 39. These cores 39 are distributed around the circumference of the wheel (as indicated diagrammatically in Fig. 7) and each magnetic core 39 is positioned to correspond with the start mark relating to a denomination or sector of track *a*. One such magnetic core 39 is shown in Figure 2. The magnetic circuits of the cores 39 are each completed once in each revolution by the magnetic yoke 41. On each core 39 are three windings 62, 63 and 64. All the windings 62 are connected together in series and are connected to receive the current signal output from the gate 57. The series of windings 62 is connected at the other end to a positive voltage so as to provide the voltage for the anode of pentode gate 57. All the windings 63 are connected in series and are in receipt of a steady biassing voltage adapted to neutralize the output in the output windings 64 at times when the yoke 41 is not increasing the magnetic coupling flux in a respective core 39. Each output coil 64 is connected to ground and via the plugboard 99 to deliver a positive igniting pulse to grids of one or the other of a series of cold cathode gas tubes 66 having a columnar significance.

From the foregoing it is seen that a signal picked up from a given sector of track *a* will always be distributed to a particular coil 64 determined by the yoke 41 being opposite such coil 64 at that time when the yoke 41 is positionally associated with a particular coil related to a particular storage sector on track *a*. Each of the coils 64 may be plugged or connected to any one or, if desired, more of the cold cathode tubes 66 to select the columnar position in which the data will be reproduced or recorded. In general the columnar arrangement required will differ from the sequence of the data sectors.

Figure 3:
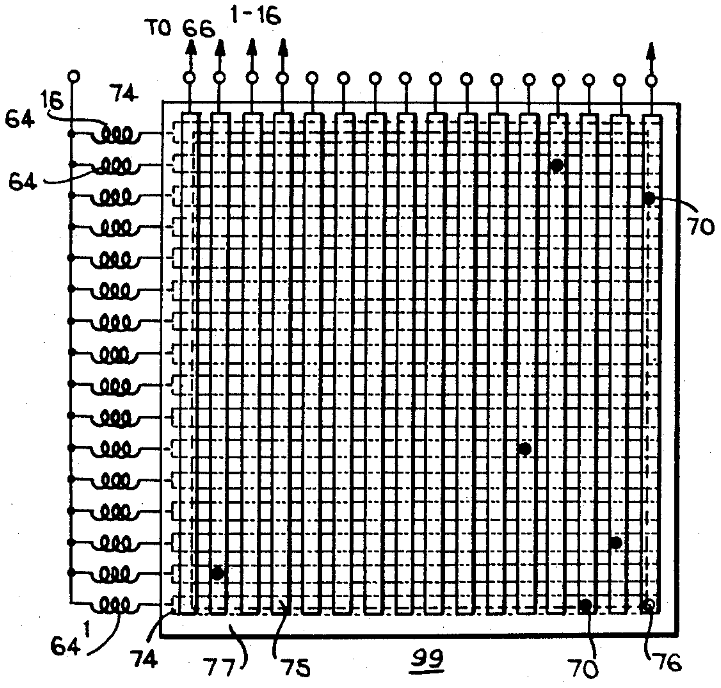
Figure 3 shows connections in a plugboard illustrated by the rectangle 99 of Figure 1.

The plugboard 99 shown in Figure 3 comprises an insulating frame 77 supporting two sets of spaced apart conducting cross bars 74 and 75. The set 74 (shown horizontal) crosses without touching the set 75 (shown vertical). These bars have holes 76 in all crossing positions (only one is shown) for reception of a conductive plug 70. These plugs may be inserted at any crossing position so as to connect any bar of one set to any bar of the other set. Each bar of set 74 is connected to an output coil $64^{1-16}$ of the inductive distributor. Each bar of the other set 75 may be connected to a grid of the cold cathode gas tube 66 according to the required column order. Thus any output coil 64 may be connected to any tube 66 by the insertion of a metallic plug 70 connecting two bars of opposite sets. Since the tubes 66 determine the ultimate columnar position of the recording and the input coils 64 each are associated with a particular sector or denomination of the storage track *a* and also the associated sector start mark on track *n* this allows any desired transposition of recording columnar position to be effected.

Figures 4, 5:
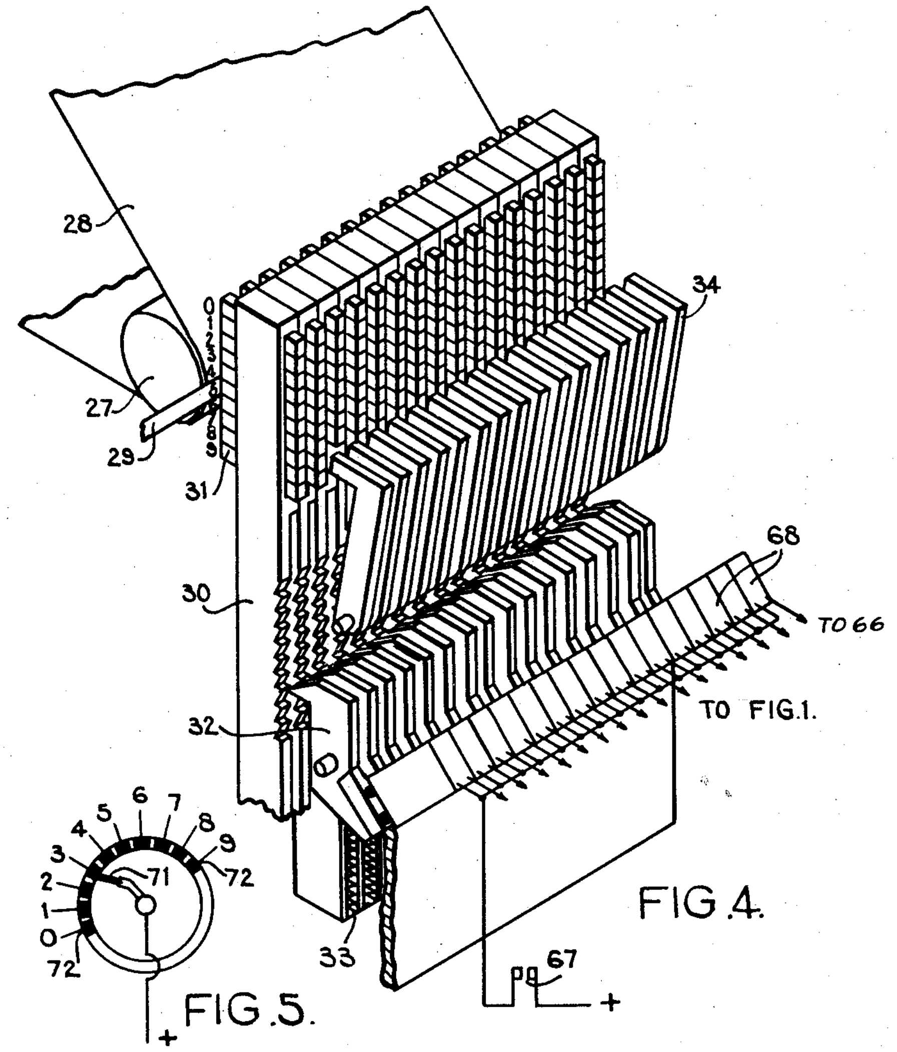
Figure 4 is a perspective representation of (as recorder) the essential elements of a print unit of the kind shown in U.S. Patent No. 1,791,762.
Figure 5 shows the emitter circuit for connection to relays of Figure 1.

The anodes of the cold cathode gas tubes 66 are connected to the character selecting electromagnets 68 of the recording apparatus Fig. 4, and thence via a circuit breaker 67 to the positive line. The cathodes are biassed so that a positive pulse from a coil 64 may effect ignition.

This circuit breaker 67 allows the gas tubes to be extinguished at a time in the recorder cycle after selection has been effected, by opening contacts 67. This time in the cycle in the case of the printer comprises the end of the setting index points "0" to "9" for digital printing or in the case of alphabetical printing after printing has been effected. In the case of the reproducing punch this cycle comprises a time after each punching, i.e., after each single index point "0" to "9" of digital punching.

Associated with the reproducer (printer and punch) is a conventional emitter (Figure 5) which delivers pulses at the possible selecting stages, i.e., operational index points of the reproducer. This comprises a brush 71 rotated in synchronism with the reproducer cycle to make contact with the segments $72^{0-9}$ in turn. These segments correspond to the operational index points "0" to "9" of the reproducer. These segments are connected one to each coil of relays $61^{0-9}$ shown in Figure 1 so that at the related value index point of the machine cycle the corresponding value sensing head is switched into operation by the respective contacts 60.

If the data track contains 12 in lieu of ten positions per denomination, and twelve heads 59 and twelve switches 60 and an emitter with twelve segments are provided, then the combination of any of the 0, 11 and 12 positions with one of the positions 9 to 1 may be punched by a reproducer having twelve punching times or index points so as to record alphabetical data. A known punch and printer will now be described for operation by electromagnets 68.

*Printer*

Figure 4 shows a print unit of the kind shown and described in greater detail in U.S. Patent No. 1,791,762 and numerous other patents. Briefly, a roll 27 feeds paper 28 under printing ribbon 29. A type bar frame reciprocable vertically in guides (not shown) carries printing bars 30 bearing type elements 31. These members 30 are formed with racks adapted to co-operate with arresting pawls 32. When so arrested during an upward movement of the frame the springs 33 are compressed until the frame reaches its top position ("9" in the index point cycle). Thereafter the hammers 34 strike (under control of a common bail not shown) that type face 31 opposite the ribbon 29 to effect printing. The arresting pawls 32 may then be released as the type bar frame is lowered.

Figure 7:
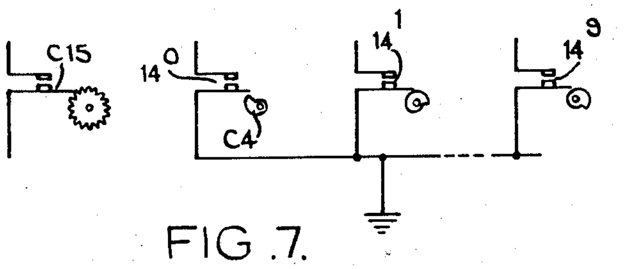
Figure 7 is a schematic presentation of the cam circuits for connection to relays of Figure 1.

The arresting pawls 32 are each controlled by an electromagnet 68. The operational index points or selection stages "0" to "9" correspond to the times in the cycle when each rising type bar frame has a type face "0" to "9" opposite the ribbon. The shaft effecting the reciprocation of the type bars also operates the emitter of Figure 7 representing index points "0" to "9." The electromagnets 68 are connected to the positive line via circuit breaker 67 also operated by a cam on the same shaft and on their other side to the respective anodes of gas tubes 66. This circuit breaker opens during the reset portion of the machine cycle, i.e., after "9" and before "0" in the next cycle.

The output gas tubes 66 may be connected in like manner to a record card punch in lieu of the printer.

*Punch*

Figure 6:
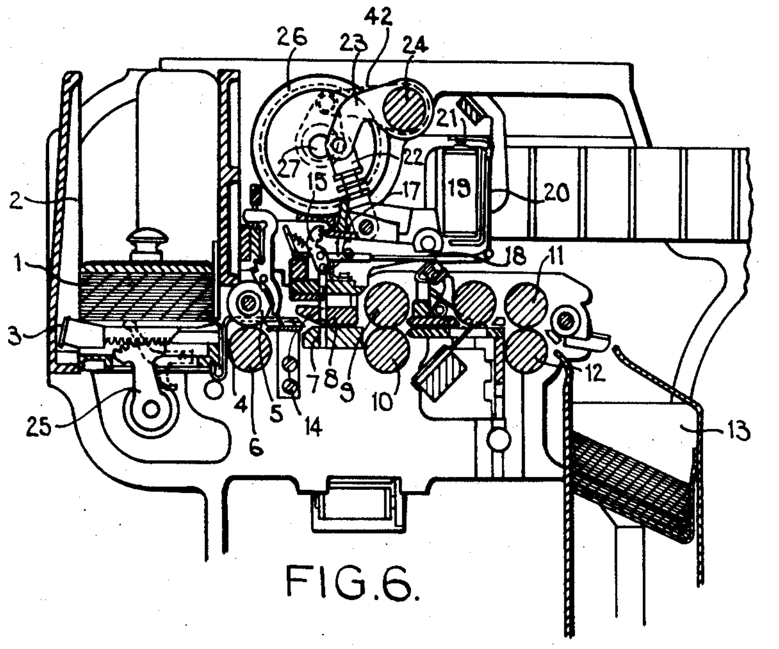
Figure 6 is a sectional side view of (as an alternative recorder to Figures 4 and 5) a conventional punch shown in greater detail in Reissue Patent No. 21,133.

A well-known punch of the kind shown and described in greater detail in Reissue Patent No. 21,133 is shown in Figure 6. Briefly, cards 1 are fed in the usual manner from a hopper 2 by means of picker knife 3 reciprocated by an arm 25 driven by a crank and reduction gearing from the gear 26 mounted on the shaft 27 continuously driven by a motor (not shown). By this means the card is fed through a throat 4 and between the driven feed rolls 5, 9 and 11 co-operating with their respective idler rolls 6, 10 and 12 to a hopper 13. The driven rolls 5, 9 and 11 are driven via Geneva gearing operated from the gear 26 so as to advance the card in a stepwise manner, so that each card is arrested with the index points of the columns in turn at the die 7 and stripper 8. The die and stripper is positioned between the feed rolls 5 and 9 in the line of the card feed so that the card may pass between them. The punch knives 14, one for each card column, are attached to interposers 15 by the pivots 16 and are sprung so that they are out of the way of a common punch bail 17. The punch bail 17 is driven through links 22 and 23 pivoting on shaft 24 and rocked by an arm 42 itself operated by an eccentric drive from shaft 27 so that the bail makes a driving stroke at each index point in synchronism with the presentation of an index point in a card at the punch knives. Upon actuation of an electromagnet 19 at an index point time, its armature 21 is attracted and through bell crank 20 the movement is transmitted to pull wire 18 which is connected to the interposer 15. This pulls the interposer 15 forward against its spring into coaction with the punch bail 17 so that the punch knife is driven down by the bail 17 and subsequently withdrawn by the bail 17 acting on the coacting notch in the interposer 15. The pull wires 18 are of varying length to allow a conveniently staggered spacing of the several magnets 19.

There is also provided a number of cam operated contacts C4. These contacts each close at a different one of the index points "0" to "9" in the card cycle and are normally utilised to control punching at particular index points. This corresponds to the emitter of the printer shown in Figure 5. There is also provided a cam C15 which opens and closes for each index point in the punch cycle. These cams are all mounted on a continuously rotating shaft making one revolution per card cycle. The machine cycle comprises the operational index points when a card index point may be presented, and further index points represented by the gap between successive cards. This punching mechanism is identical with the punching mechanism in Reissue Patent No. 21,133, to which reference may be made for further particulars. Punch magnets 19 correspond in function to the print selection magnets 68 (Figure 4), differing only in timing of C15 and contact 67.

The windings of the punch magnets 19 are each connected to an anode of the gas tubes 66 shown in Figure 2. The other side of the windings 19 are connected via cam contacts C15 to the positive line. In this manner the output gas tubes 66 of Figure 1 are reset after each index point. The contacts 14 "0" to 14 "9" are connected to relays 61 having contacts 60 (Figure 1) so that these relays are each operated in turn at the successive index points "0" to "9" of the punch cycle, and correspond to the emitter shown in relation to the printer.

From the foregoing it is seen that whenever the recorder emitter or cams are at an operational index point, the appropriate relay 61 is operated to close its contacts 60 and so select the related sensing head for this value, and whichever is the first start mark 37 in any sector of track $n$ to register thereafter with the sensing head 36 initiates a cycle of data read out of one value. The repeated energization of cold cathode gas tubes 66 resulting from a reproducer index point lasting longer than one drum revolution is immaterial. It is equally immaterial which is the first sector with which read out commences.

This is then repeated for each value in turn under control of the successive index point times.

It will be understood that each of the elements described above, or two or more together, may also find a useful application in other types of apparatus for recording of digital information differing from the types described above.

While the invention has been illustrated and described as embodied in apparatus for recording of digital information in parallel form from a source of stored character signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for recording stored data in parallel comprising a magnetic storage device adapted for continuous rotation having characters recorded in successive sectors thereof, sensing means for sensing all said sectors sequentially, means to select each possible different character for read out in turn, only one kind of character being selected for read out from each said sensing of the sectors, and means to distribute the signals of each sector to a different column of a parallel recorder so that all the characters are recorded in one cycle of the recorder.

2. Cyclically operated apparatus for recording characters in parallel columns from stored data in which the data is sensed serially comprising a rotatable magnetic storage drum having character representing signals recorded in sectors thereon and timing marks on said drum for each sector adapted to control the time of read out of sensed sectors, sensing means for sensing said marks and sensing means for sensing said sectors sector by sector, and distributing means operated synchronously with said drum rotations for distributing each read out sector signal for recording in preselected columns of a parallel column recorder, and control means to control the selection of each different character in said data for read out in succession, one kind of character signal being selected by said control means for read out for at least one complete sensing of all the sectors during each operational index point, i.e. character selecting index point of the cycle of the recorder.

3. Apparatus for recording data sensed serially in parallel columns comprising a magnetic drum adapted for rotation and storing data signals in sectors around the circumference, each sector being adapted to record signals representing any of a plurality of characters, sector sensing means, means to control the said sensing means, means operated synchronously with the drum to distribute sensed signals to character selecting means of a parallel recorder so as to associate each sector with a particular column, the sensing cycle being asynchronous to the recorder cycle, means operated synchronously with the recorder cycle for selecting each possible character of the plurality for read out in succession, one character being selected for read out for at least one revolution of the magnetic drum under control of impulses timed in the cycle of the recorder, to effect recording of all the data signals in one cycle of the recorder.

4. Apparatus as claimed in claim 3 having means for identifying the start of each sector, and sensing means therefor connected to control the start of a character code read out upon that first identification after initiation of each said timed impulse in the cycle of the recorder.

5. Apparatus for recording in parallel form stored digital data sensed serially comprising a rotatable magnetic store, storing signals in sectors, each sector being adapted to store the plurality of digits by a signal in one of a like plurality of positions in each sector and a like plurality of digit sensing means, said drum having timing marks and sensing means therefor for gating the signals sensed by the sector sensing means, means controlled in timed relation to the cycle of a recorder for selecting each of said digit sensing means in turn, means for distributing the gated signals to gas tubes one per read out sector, and means operated by the gase tubes for selecting the read out character for recording.

6. Apparatus as claimed in claim 5, in which the gas tube operated means are electromagnets each controlling the selection of characters by the time in the cycle of the recorder at which they are operated and each relating to one column of recording.

7. Apparatus as claimed in claim 6 in which the distributor comprises a plurality of magnetizable cores, and a rotatable magnetic yoke rotating synchronously with the drum and adapted to reduce the reluctance of each magnetizable core in turn, one core being provided for each sector, each core having an input winding and an output winding, said input windings being connected to the controlled sensed signals and each output winding to control a said gas tube.

8. Apparatus for distributing character codes recorded in sectors of a rotatable magnetic store to recording apparatus adapted to record characters in parallel columns and having character selecting means for each column, comprising sensing means for sensing said character codes sector by sector, and magnetic cores, one for each sector, having an input winding for each core operated by said sensed signals, an output winding for each core each connected to operate said columnar character selecting means, and means to alter the flux coupling the input and the output windings of each core in turn.

9. Apparatus as claimed in claim 8, in which the means to alter the flux comprises a magnetizable yoke traversing each core in turn in synchronism with the passage of each sector under the said sensing means.

10. Apparatus as claimed in claim 9, in which the cores have a third winding biassed to prevent spurious output signals from those output windings of the cores whose flux is not being altered by the said yoke upon energization of input coils.

11. Apparatus for operating a parallel column recorder of the type described to record data sensed serially comprising a magnetizable data store storing data in a circular track thereon, means to rotate said store at a speed in excess of one revolution per operational index point of the recorder and asynchronously in respect of the recorder, sensing means for said data track switched under control of said recorder at operational index point times to select each possible character in turn and effective during each setting of said switches to read out one character from all positions in which the one character is stored commencing with whichever position is first sensed after the setting of said switches.

12. Apparatus for recording, with a multi-column cyclically operable parallel recorder having a character selecting mechanism for each column, columnar character information, comprising, in combination, a storage device having storage areas for character signals, each area being adapted for storage, in a plurality of respective positions therein, of any one of a plurality of character signals designed to be recorded in a column; a plurality of sensing means respectively associated with said positions to cyclically sense all of said positions of all of said storage areas in succession in each one cyclical movement of said storage device relative to said sensing means; distributor means synchronized with said cyclical sensing means and connected with said sensing means to distribute signals sensed from each storage area to a pre-selected character selecting mechanism of the recorder for selectively recording such signals in corresponding columns of the recorder; selector means connected with said sensing means for selecting individual sensing means for reading out, from selected positions within said storage areas, character signals stored in such selected positions; and emitter means for controlling said selector means so as to select different character signals in turn, during consecutive sensing cycles, whereby all said character signals are read out within one cycle of the recorder.

13. Apparatus for recording characters, in parallel columns, as sensed serially from stored data, comprising in combination, a cyclically operable parallel recorder having a character selecting mechanism for each column; a storage device having storage areas for character signals representing columnar information stored in a plurality of respective positions within said areas, respectively; a plurality of sensing means respectively associated with said positions to cyclically sense all of said positions of all of said storage areas in succession in each one cyclical movement of said storage device relative to said sensing means; distributing means synchronized with said cyclical sensing and connected with said sensing means to distribute signals sensed from each storage area to said character selecting mechanism of the recorder; selector means connected with said sensing means for selecting individual ones of said sensing means for reading out, from selected positions within said storage areas, character signals stored in such selected positions; and emitter means operatively connected with said recorder for controlling said selector means so as to select all like character signals from said storage areas for readout, in turn character by character, during consecutive complete cycles of sensing of said storage areas, whereby all of said character signals are selected for readout successively within one cycle of the recorder.

14. Apparatus for recording characters, in parallel columns, comprising, in combination, a cyclically operable parallel recorder having character signal recording means for each column, movable, during each recording cycle of said recorder, through a succession of recording positions and being operative at the time of recording within cyclic moments associated with said recording positions, whereby said respective time of being operative determines the character signal being recorded; a storage device having storage areas for character signals representing columnar information stored in a plurality of respective positions within said areas; a plurality of sensing means respectively associated with said positions to sequentially sense all of said positions of all of said storage areas, in succession, in each one cyclical movement of said storage device relative to said sensing means; distributing means synchronized with said cyclical signal recording means and connected with said sensing means to associte each particular storage area with a particular one of said parallel record columns; selector means connected with said sensing means to select only one character signal for read-out, per cycle, from storage in corresponding positions within said storage areas, respectively, during complete sequential sensing cycles; and emitter means operable in synchronism with said recorder for controlling said selector means so as to enable said recorder to record all of said character signals successively in one cyclic operation of said recorder.

15. Apparatus for recording characters, in parallel columns, as sensed serially from stored data, comprising, in combination, a cyclically operable parallel recorder having a character selecting mechanism for each column; a rotatable magnetic storage device having storage areas for character signals representing columnar information stored in a plurality of respective positions within said areas; a plurality of sensing means respectively associated with said positions to cyclically sense all of said positions of all of said storage areas in succession in each one cyclical movement of said storage device relative to said sensing means; distributing means synchronized with said cyclical sensing and connected with said sensing means to distribute signals sensed from each storage area to said character selecting mechanisms of the recorder, respectively; selector means connected with said sensing means for selecting a particular one of said character signals for readout from storage during one sensing cycle of said sensing means; and emitter means operatively connected with said recorder for controlling said selector means so as to select a different character signal for readout on each successive sensing cycle of said sensing means thereby to enable said recorder to control selection of character signals to be successively recorded in parallel in said columns and corresponding to said signals sensed from said storage areas.

References Cited in the file of this patent

UNITED STATES PATENTS 2,727,685 Wilson ________________ Dec. 20, 1955